United States Patent Office 3,372,999
Patented Mar. 12, 1968

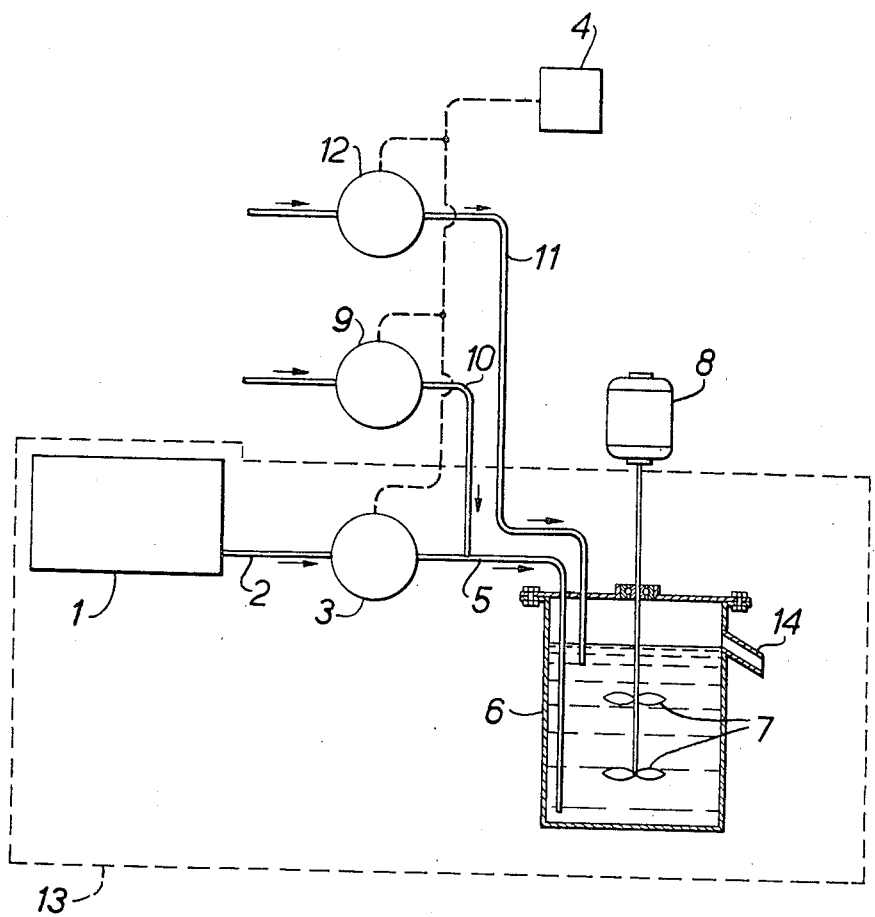

3,372,999
CONTINUOUS PRECIPITATION PROCESS FOR RECOVERING URANIUM AND/OR PLUTONIUM FROM SOLUTION
David Gordon Stevenson, Kempshott, Basingstoke, England, assignor to United Kingdom Atomic Energy Authority, London, England
Filed Mar. 9, 1965, Ser. No. 438,195
Claims priority, application Great Britain, Mar. 20, 1964, 12,027/64
7 Claims. (Cl. 23—332)

ABSTRACT OF THE DISCLOSURE

The invention relates to an improvement in a continuous process for precipitating uranium and plutonium compounds from solution by adding a base thereto. In accordance with the invention, readily filterable precipitates are obtained by introducing an acidic aqueous solution of a metal to be precipitated together with a base into a precipitation zone in the presence of an aliphatic monocarboxylic acid having from 1 to 5 carbon atoms.

---

This invention relates to a continuous process for precipitating uranium and/or plutonium compounds from solution by the addition of a base thereto.

The invention has its prime application in the precipitation of these compounds in high yield as a step in the manufacture of plutonium oxides and uranium oxides for nuclear reactor fuel elements.

In the precipitation of the above materials, either separately or together, it is necessary to control the process conditions so that the maximum yield of readily filterable precipitate is achieved. Once the optimum process conditions have been achieved it has up to now been necessary, in order to maintain these conditions, to monitor the precipitation conditions continuously and to use a feedback control system which adjusts the relative feed rate of the reagents. Automatic feedback control, based on the use of glass electrodes to monitor the instantaneous pH of the reaction, is capable of providing good control for limited periods of time, but over longer periods under routine plant conditions in the precipitation of the above compounds the control system has been found to fail.

Investigations have shown that the failures are due to false pH indications received from the glass electrodes. Under the precipitation conditions a fine deposit of high electrical resistance forms on the electrodes and this allows the pH to drift unnoticed.

A primary object of this invention is to provide a continuous process in which optimum conditions, once reached, can be maintained without the use of continuous monitoring systems.

The invention provides a further benefit when it is desired to co-precipitate plutonium and uranium compounds, as required for example in the production of mixed uranium/plutonium oxides for nuclear fuel purposes. The tendency of the plutonium compounds to precipitate before the uranium compounds is virtually eliminated by the invention.

The invention consists in a continuous process which comprises feeding an acidic aqueous solution of a salt of uranium and/or plutonium into a precipitation zone, feeding an aliphatic $C_1$ to $C_5$ monocarboxylic acid into the said precipitation zone in amount sufficient to form a complex ion with the metallic ions of the said salts, but insufficient to precipitate a salt of said monocarboxylic acid with said metallic ions, feeding a base into the precipitation zone to form a precipitate of a compound of uranium and/or plutonium, and withdrawing the precipitate from the precipitation zone.

Uranyl salts are the most convenient uranium salts, and the chloride or nitrate may be used. Plutonium is preferably present in its tetravalent form. The aqueous solution is maintained acid preferably at pH 5–6, to prevent undesirable precipitation of basic uranyl compounds or basic plutonium compounds in the feed lines. A mineral acid is preferred for this purpose and nitric acid can be used conveniently.

Acetic acid is the preferred monocarboxylic acid. Formic acid can be used although its volatility is higher. The solubilities of the $C_3$–$C_5$ acids are lower than that of acetic acid.

The process is preferably carried out at elevated temperature to improve the coarseness of the precipitate. Room temperature can, however, be used if necessary.

Ammonia is the preferred base for use when it is desired to produce a precipitate which can be easily purified. Other bases, such as alkali metal hydroxides can be used if contamination of the precipitate is unimportant.

While it is preferred to feed ammonia as its aqueous solution into the precipitation zone this is not essential since the ammonia could be fed in as a gas and allowed to dissolve directly in the acidic aqueous solution.

The concentration of the said $C_1$ to $C_5$ monocarboxylic acid is desirably not less than 0.1 N or more than 5 N. It is sufficient to form soluble complexes of the said monocarboxylic acid and the uranium and plutonium radicals. The upper limit is determined by the level at which uranyl acetate would begin to crystallise out in the precipitate.

The accompanying drawing is a flowsheet illustrating an embodiment of the process of the invention.

In the drawing a tank 1 contains an acidic solution of a plutonium and/or uranium salt. The exact nature of the solution will of course be governed by the particular process to be operated. It may be, for example, uranyl nitrate solution containing some nitric acid. The solution is fed along pipe line 2 by a metering pump 3 which is driven by a hydraulic actuator 4, and from the metering pump 3 the solution is fed along pipe line 5 into a precipitator 6 fitted with a stirrer 7 driven by a motor 8.

Acetic acid is fed via a metering pump 9 and pipeline 10 into pipeline 5 where it mixes with the uranyl nitrate solution and is fed therewith into the precipitator 6.

Ammonia solution is fed along pipeline 11 by metering pump 12 driven by hydraulic actuator 4.

A radiation shield 13 contains the radiation from radioactive materials. Precipitate produced in the precipitator 6 is carried as a slurry through outlet 14 and passed to filters which for simplicity have not been shown.

It can be seen that the precipitation process can be controlled by the metering pumps alone. Once these have been set, the setting being a matter of routine experiment, the process can be left unattended for long periods of time.

In the absence of the acetic acid, the feed rates of the materials needed constant attention.

The following examples illustrate the invention.

Example 1

An aqueous solution of uranyl nitrate containing 0.63 mole of uranyl nitrate per litre and 2 moles of nitric acid per litre was fed continuously at 3 litres/hour into a 1.5 litre well stirred vessel having an outlet near the top for slurry. Aqueous ammonia solution containing 13.5 moles of $NH_4OH$ per litre and 0.5 mole of acetic acid per litre was fed, via a separate feed inlet, at a rate of 1 litre/hour into the said vessel. Control of feed rates was achieved by hydraulic diaphragm pumps and the fluctuations in feed rate were ±5%.

Ammonium diuranate precipitated consistently as a coarse readily filterable solid, the yield being above 99.9%. The precipitation reaction was operated satisfactorily for 8 hours without adjustment of the feed rates, the pH of the reaction mixture varying by less than ±0.5.

In contrast to this, when the acetic acid was not used a precipitate of variable coarseness was produced and the efficiency fluctuated sharply, necessitating constant observation and adjustment of feed rates. The pH fluctuated by ±2.5 pH units.

*Example 2*

An aqueous solution containing 0.53 mole of uranyl nitrate per litre, with 0.12 mole of plutonium nitrate per litre and 2 moles of nitric acid per litre was precipitated under similar conditions to the foregoing example. In one experiment this solution was precipitated with 13.5 N aqueous ammonia solution, and in another with 13.5 N aqueous ammonia solution containing 0.5 mole of ammonium acetate per litre. At similar hydrogen ion concentrations as monitored by glass electrodes the precipitate obtained from the experiment in which the acetate was incorporated settled twice as fast and showed a quarter of the filtration resistance of the other. Furthermore when operated without frequent adjustment of flow rate the solution containing acetate yielded a more consistent product, when operated over several hours.

In the above examples the feed pumps had a fixed fluctuation in feed rate of ±5%. If it were possible to use very accurate pumps it would be necessary to control the feed rate to within ±0.1% in the absence of acetate in order to obtain a pH fluctuation of less than ±0.5%.

I claim:

1. A continuous process for precipitating a compound of the group consisting of uranium and plutonium compounds from solution which comprises introducing an acidic aqueous solution of at least one salt of the group consisting of uranium and plutonium salts into a precipitation zone, and introducing a base from without the precipitation zone into said precipitation zone in the presence of an aliphatic $C_1$ to $C_5$ monocarboxylic acid to form a precipitate of a compound formed with the base and the metal ions of said salt, said monocarboxylic acid being present in amount sufficient to form a complex ion with the metal ions of said salts but insufficient to precipitate a salt of said monocarboxylic acid with said metal ions in the absence of said base, and withdrawing the precipitate from the precipitation zone.

2. A continuous process according to claim 1 wherein said monocarboxylic acid is added to said aqueous acidic solution prior to the introduction thereof into said precipitation zone.

3. A continuous process according to claim 1 wherein said monocarboxylic acid is provided in said precipitation zone by introducing an aqueous solution thereof into said zone.

4. A continuous process according to claim 1 wherein said monocarboxylic acid is added to said base prior to the introduction thereof into said precipitation zone.

5. A continuous process as claimed in claim 1 wherein said aqueous acidic solution includes salts of uranium and plutonium.

6. A continuous process as claimed in claim 1 wherein said monocarboxylic acid is acetic acid.

7. A continuous process as claimed in claim 1 wherein the base is selected from the group consisting of alkali metal hydroxide, ammonia, and aqueous solutions thereof.

References Cited

FOREIGN PATENTS 785,997  11/1957  Great Britain.

OTHER REFERENCES

Morrison et al.: "Organic Chemistry," Allyn and Bacon, Inc., July 1959, p. 482.

CARL D. QUARFORTH, *Primary Examiner.*

S. TRAUB, R. L. GRUDZIECKI, *Assistant Examiners.*